United States Patent
Fischer et al.

(12) 
(10) Patent No.: US 6,289,459 B1
(45) Date of Patent: Sep. 11, 2001

(54) PROCESSOR UNIQUE PROCESSOR NUMBER FEATURE WITH A USER CONTROLLABLE DISABLE CAPABILITY

(75) Inventors: Stephen A. Fischer, Gold River, CA (US); Shreekant S. Thakkar, Portland, OR (US); Robert R. Sullivan, Pleasanton, CA (US); Frederick J. Pollack, Miami Beach, FL (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/235,054

(22) Filed: Jan. 20, 1999

(51) Int. Cl.7 .................................................. G06F 11/00
(52) U.S. Cl. ........................................... 713/200; 713/201
(58) Field of Search ................................... 713/200, 201, 713/202

(56) References Cited

U.S. PATENT DOCUMENTS 5,732,207  3/1998  Allen et al. ...................... 395/182.03

FOREIGN PATENT DOCUMENTS 798620  10/1997  (EP) ................................. G06F/1/00
9736237  10/1997  (WO) .............................. G06F/12/14

OTHER PUBLICATIONS

Processor Serial Number Control Utility Download Page, www.intel.com.*
"ReadMe.txt" for Intel processor serial number control utility Version 1.03–Read ME Notes. Jan. 21, 1999 downloaded from www.intel.com.*
Miles, Stephanie "Pentium III: How bad is privacy threat?" Mar. 26, 1999 www.cnet.com.*
Kanellos, Michael "Intel to phase out serial number feature" Apr. 27, 2000 www.cnet.com.*
Kanellos, Michael "Intel touts Pentium III enhancements" Feb. 17, 1999, www.cent.com.*
"Common BIOS Services for Vital Product Data in Personal Systems" IBM Technical Disclosure Bulletin, Jul. 1994, vol. 37, issue 7, pp. 429–434.*
"no Rhye or Reason to dealing with with online privacy: INtel backs down on plans for identifying serial number in New Pentium III chip" Electronic Commerce News (Feb. 1, 1999) vol. 4, No. 5.*
Int'l Search Report, Application No. PCT/US00/01088, mailed May 23, 2000, 3 pgs.
*Pentium® II Xeon™ Processor Specification Update*, Intel Corporation, 1998, 64pgs.
*Intel Processor Indentification and the CPIUD Instruction*, Application Note–485, Intel Corporation, Dec. 1998, 47 pages.

* cited by examiner

*Primary Examiner*—Robert Beausoleil
*Assistant Examiner*—Bryce P. Bonzo
(74) *Attorney, Agent, or Firm*—Blakely, Sokoloff, Taylor & Zafman LLP

(57) ABSTRACT

A software method of setting a state in a processor regarding whether a processor number encoded in the processor will be available for reading is described. The method comprises prompting the user to enter an indication whether the processor number should be available for reading by a program. Then, setting a state to inhibit the processor number from being read by a program if the indication indicates that the processor number should not be available for reading by the program. For one embodiment, the method further includes testing the indication if a request for the processor number is received, and releasing the processor number if the indication indicates that the processor number is available.

20 Claims, 6 Drawing Sheets

| PARAMETER | OUTPUTS OF CPUID |
|---|---|
| EAX = 0 | EAX ← HIGHEST VALUE RECOGNIZED BY CPUID INSTRUCTION |
| | EBX:EDX:ECX ← VENDOR IDENTIFICATION STRING |
| EAX = 1 | EAX ← PROCESSOR SIGNATURE (VERSION IDENTIFICATION) |
| | EDX ← FEATURE FLAGS |
| | EBX:ECX ← RESERVED |
| EAX = 2 | EAX:EBX:ECX:EDX ← PROCESSOR CONFIGURATION PARAMETERS |
| EAX = 3 | EAX:EBX:ECX:EDX ← PROCESSOR NUMBER |
| EAX > 3 | RESERVED |

FIG.3

PROCESSOR UNIQUE PROCESSOR NUMBER FEATURE WITH A USER CONTROLLABLE DISABLE CAPABILITY

FIELD OF THE INVENTION

The present invention relates to processor identification, and more specifically, to user controllable processor identification.

BACKGROUND

One prior art method of including a processor number is described in U.S. Pat. No. 5,732,207. A CMOS microprocessor chip includes an on chip single poly EPROM that is process compatible with the CMOS process used to manufacture the microprocessor. The EPROM is used to store manufacturing and contract related data such as processor number, customer, and process related data such as wafer number test results, binning data, etc. This provides important information for quality and reliability control.

Past systems with processor number capability do not have the ability to provide a tamper-resistant disable capability. This is becoming more of a concern as users become more concerned with their privacy.

SUMMARY OF THE INVENTION

A software method of setting a state in a processor regarding whether a processor number encoded in the processor will be available for reading is described. The method comprises prompting the user to enter an indication whether the processor number should be available for reading by a program. Then, setting a state to inhibit the processor number from being read by a program if the indication indicates that the processor number should not be available for reading by the program.

For one embodiment, the method further includes testing the indication if a request for the processor number is received, and releasing the processor number if the indication indicates that the processor number is available.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a table of the output of the CPUID instruction with different input parameters.

DETAILED DESCRIPTION

A method and apparatus for setting and using a state in a processor regarding whether a processor number encoded in the processor will be available for is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

An externally software visible processor number capability provides an important capability for enabling applications in the area of software copy protection, electronic commerce, electronic banking, system access security, among others. In these areas it may be important to have a unique signature to distinguish one computer system (and user) apart from any other by giving each system a potentially unique identity, easily readable from the operating system or a software application (i.e. via the CPUID instruction).

However, users of a processor with such a capability may also have concerns with respect to the privacy of this processor number and may not want this to become available or visible to external software. These concerns may have to do with unauthorized person(s) and/or software accessing the processor number potentially across the Internet and thus revealing more information about the system or user of it then he or she wishes to divulge. Furthermore, software incorporating copy-protection that makes use of the processor number feature may need to be turned off in the event of alternative needs concerning the use of such software.

By embedding a tamper-proof or resistant disable capability within the internal logic and microcode of the processor, external software is prevented from re-enabling this capability against the wishes of the user and/or manager of the system. Encapsulating the disable capability within the processor also helps prevent the tampering with the contents of the processor number itself. An external system implementation implies the processor number is potentially visible on pins between devices, thus making it more prone to tampering with the system logic.

Figure 1:
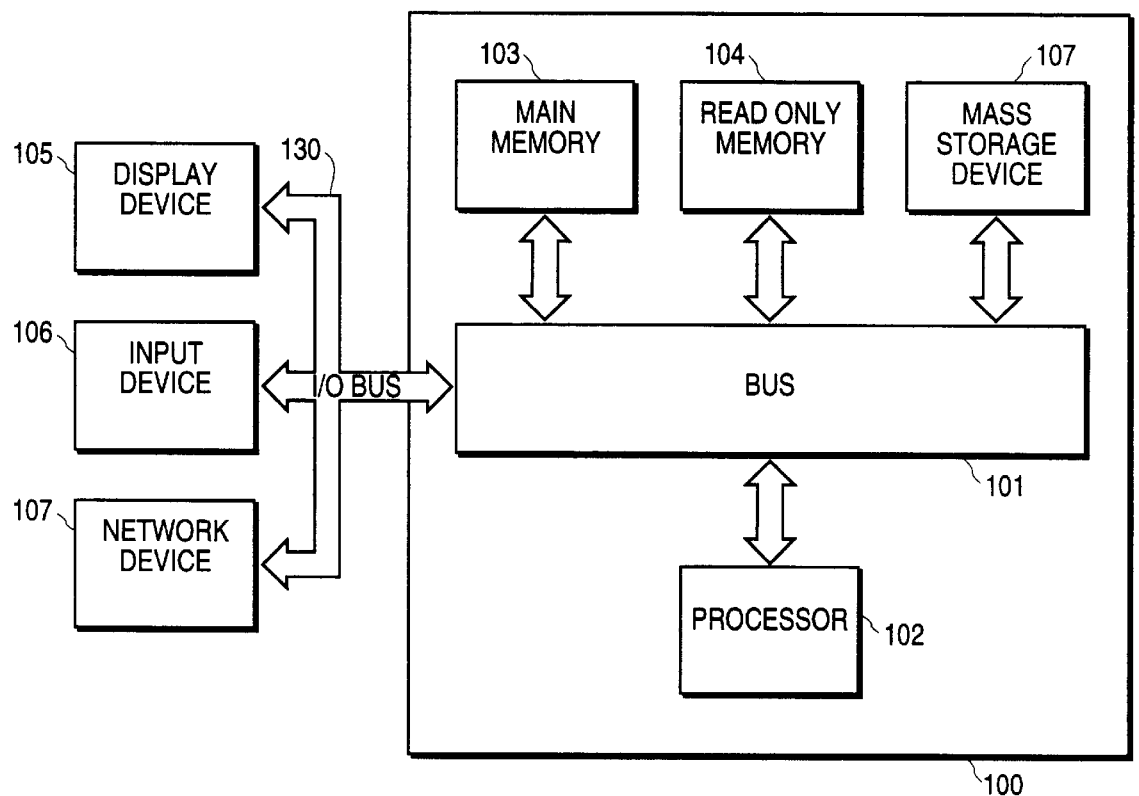
FIG. 1 is a block diagram of a computer system.

A processor is provided with a unique processor number. FIG. 1 is a block diagram of one embodiment of a computer system in which an embodiment of the present invention can be implemented. Computer system 100 comprises a bus 101 or other communication means for communicating information, and a processor 102 coupled with bus 101 for processing information. Computer system 100 also comprises a read only memory (ROM) and/or other static storage device 106 coupled to bus 101 for storing static information and instructions for processor 102.

The computer system 100 further comprises a main memory 103, a dynamic storage device for storing information and instructions to be executed. Main memory 103 also may be used for storing temporary variables or other intermediate information during execution of instructions. In one embodiment the main memory 103 is dynamic random access memory (DRAM).

Computer system 100 can also be coupled via I/O bus 130 to a display device 105, such as a cathode ray tube (CRT) or liquid crystal display (LCD) screen, for displaying information to a computer user. An input device 106 is typically coupled to I/O bus 130 for communicating information and command selections to processor 102. Another type of user input device 106 is cursor control device 106, such as a mouse, a trackball, trackpad, or cursor direction keys for communicating direction information and command selections to processor 102 and for controlling cursor movement on display device 105. Alternatively, other input devices 106 such as a stylus or pen can be used to interact with the display.

The computer system 100 may further be coupled via the I/O bus 130 to a network device 110 for communicating with other computers. The network device 110 may be a modem, a network card, or other device to communicate between the computer system 100 and other systems or networks.

Figure 2:
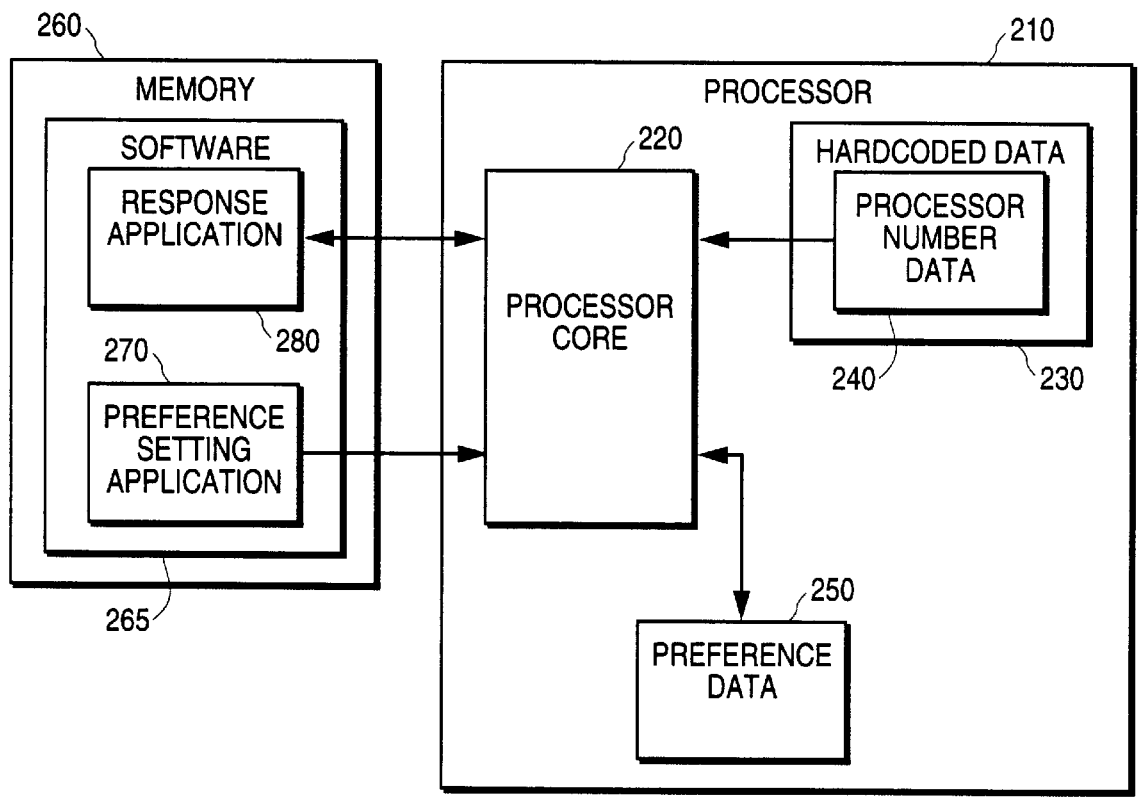
FIG. 2 is a block diagram of a processor including a processor number.

FIG. 2 is a block diagram of one embodiment of a processor implementing the present invention. The processor 210 includes a processor core 220 for executing instructions. The processor further includes preference data 250. The preference data 250 may be stored in multiple ways. For one embodiment, the value of preference data 250 only changes when the processor 210 is rebooted. For another embodiment, the preference data 250 may be changed by the user using a software application. For yet another embodiment, the preference data 250 may be changed in one direction—to prevent access to the processor number—via software, while it may only be changed in the other direction—to extend more access—at booting.

The processor 210 further includes hard coded data 230. Hard coded data 230 is any data that is not changeable at all. For one embodiment, hard coded data 230 further includes processor number data 240. Processor number data 240 is a unique identification of the processor 210. This unique identification may be used by the processor, for security, and for other purposes.

Memory 260 includes software 265. The software 265 is executed by processor 210, however, for simplicity, the software is illustrated in memory 260.

Software 265 includes preference setting application 270. Preference setting application 270 is a software application that permits a user to set a preference whether the processor number data should be available for reading or whether it should not be readable. In an embodiment, the preference setting application 270 is run only when the processor 210 is booted up. The preference setting application 270 receives user input and/or determines based on BIOS settings what the user's preference is regarding the display of the processor number data. The preference setting application then stores the preference data 250 as allowed by the processor core 220.

Software 265 may further include response application 280. Response application 280 is called when a process requests the processor number data 240. That requesting process may be generated either locally or remotely. The requesting process may be, for example, a Java applet provided over a computer network or over the Internet. The response application 280 makes a request through the processor core 220 to determine based on the preference data 250 whether the processor number should be available to the requester. For one embodiment the preference data 250 indicates whether the processor number should be released to a requester.

For one embodiment, access may be limited to certain requesters. For example, release of the processor number may be permitted for requests generated on a local area network, or from a specific server, but may not be permitted if the request comes from the Internet. For one embodiment, this decision may be made based on the IP address of the requester. If the preference data 250 indicates that the processor number is available to the requester, the response application 280 is permitted to retrieve the processor number data 240, and passes the data to the requesting process. The user may permit the release of the processor number either to all requesters, or too a specific class or classes of requesters.

One method of retrieving the processor number may be through an extension of the CPUID instruction. Alternately, other methods of fetching the processor number may be implemented. FIG. 3 is a table illustrating the output of the CPUID instruction. The processor number is an unique identifier of a particular processor. This unique identifier may be used in various ways. However, a user may wish to prevent access to the processor number. The processor number information is provided as an extension to the existing CPUID macro instruction derived from information that is internally readable from the processor microcode. For one embodiment, the "uniqueness" of the processor number is only to the extent of the normal DPM (defects per million) of the manufacturing process. For another embodiment, a special instruction, a read or move instruction, or another method may be used to retrieve the processor number. Methods of obtaining such data are known to those skilled in the art.

Figure 4:
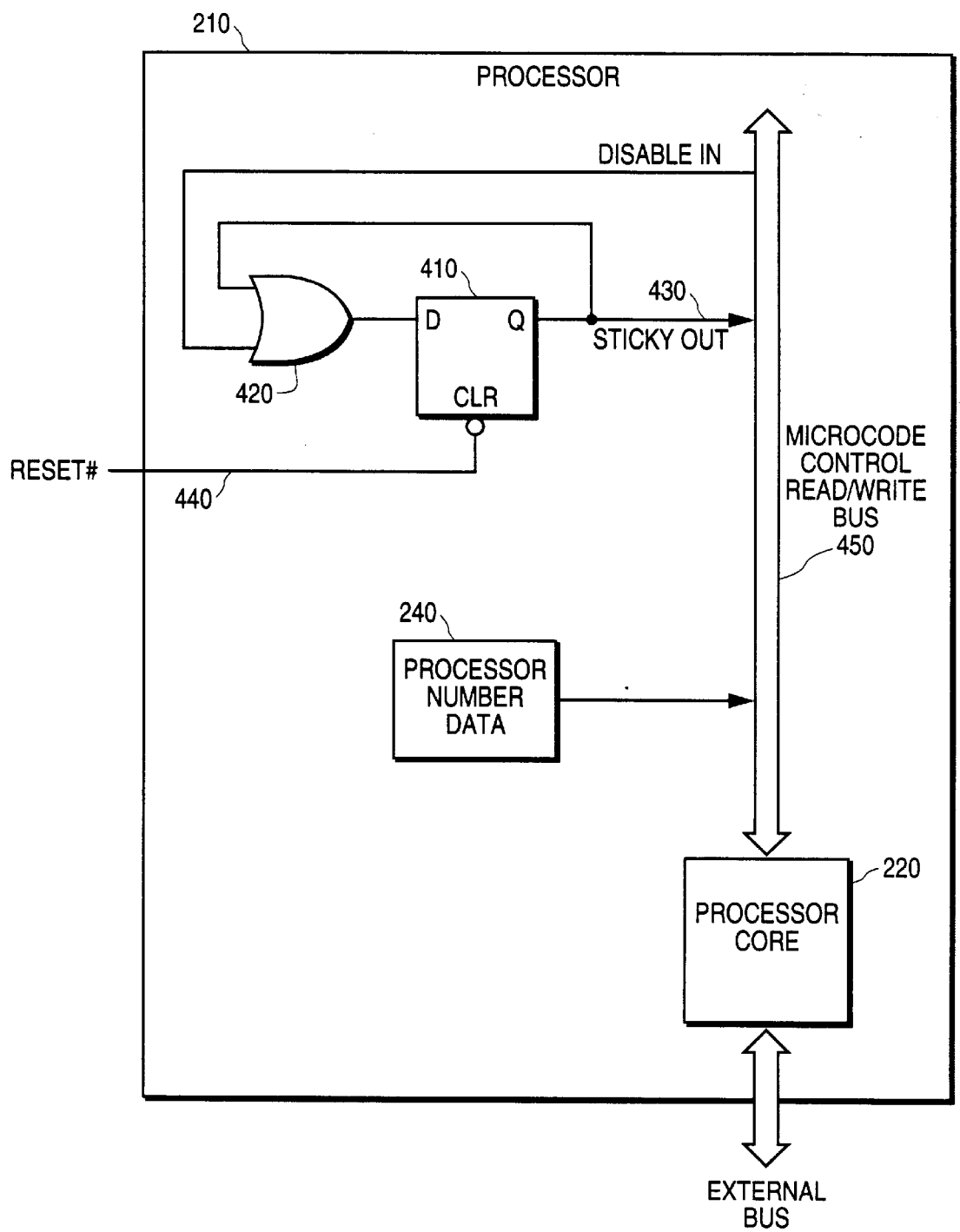
FIG. 4 is a block diagram of one embodiment of a sticky bit latch.

FIG. 4 is a block diagram of one implementation of a sticky bit latch. For simplicity a single bit latch is illustrated. However, it is understood that this technique could be extended to multiple bits. A mechanism for maintaining the sticky bit in one setting without permitting a third party, not the authorized user/manager to change it is needed. For one embodiment, this is implemented in software. For another embodiment, the sticky bit is stored in a register which is not accessible after initial booting. For another embodiment, the sticky bit is stored in a latch as illustrated in FIG. 4. For yet another embodiment, the sticky bit is stored in non-volatile storage, such as flash memory. For another embodiment, another means of storing the sticky bit that is tamper resistant may be used.

A set-only "sticky" latch bit determines whether the processor number is to be released. The sticky bit is read by microcode to determine if the processor number information is to become externally software visible via the CPUID macro instruction. If this sticky bit is zero, then the processor number feature is allowed to be "visible". If this sticky bit is one, then the processor number is "not visible" and the CPUID macro instruction behaves as if the processor number feature does not exist as implemented by the processor microcode. Once the sticky bit is set, only a hard reset (i.e. asserted at system power up) can reset this bit. This enables the operator and/or manager of the system to have positive control over the disabling of this feature, as facilitated via a system BIOS configuration option or software utility run at operating system boot time. As a result, external software applications can not make use of the processor number feature unless specifically allowed by the operator/manager of the system.

The processor 210 includes the processor number data 240. For one embodiment, the processor further includes a D-type flip-flop 410. The input to the D-type flip-flop 410 is an output of an OR function 420. The output of the D-type flip-flop 410 is the sticky output signal 430. The input to the OR function 420 is sticky output signal 430 and the value on the bus 450 transmitting new the sticky output signal 430. The clear function of the D-type flip-flop 410 is triggered by a reset 440. For one embodiment, the reset is triggered by a hard boot of the entire computer system. When the D-type flip-flop 410 is reset, the sticky output 430 is zero. The other input to the OR function 420 is the user's preference, on the bus 450. Therefore, the output of the OR function 420 is the value of the user's preference, which becomes latched by the D-type flip-flop 410 during a write of the user preference data 250 by the processor core 220. This makes the value of the sticky output 430 stable until a reset signal 440 is received, at which point a new output may be latched by the D-type flip flop 410.

Other methods of maintaining a stable value that is only reset by a reboot may be used to store the value of the sticky bit.

For one embodiment, the processor 210 may have more than one sticky bit so that the user (or system administrator) may support different levels of access to the processor number. For example, if a first sticky bit is clear, only a program that originated with the specific computer may be able to read the processor number. Other sticky bits may be used to limit the reading of the processor number to servers on the network or on a particular subnetwork. Further, an additional sticky bit may be used to block access to the processor number to programs that originate on computers that are outside a firewall. For another embodiment, the sticky bits may provide access privileges to requesters at different privilege levels, as defined by Intel Architecture's protection mechanism. For another embodiment, other means of differentiating between requesters of different levels may be used.

For one embodiment, the sticky bits is a single multiple bit number indicating the highest permissible level of access. Thus, for example, the range of the sticky bit can be from zero, access to everyone, to 1111, access to no one. For another embodiment a user may permit access to the processor number by programs within the computer and on the Internet, while restricting access to requesters on a particular subnetwork.

For another embodiment, the multiple sticky bits may be implemented individually, together, or a combination of both. The sticky bit may be stored in a reserved register, or another location that is tamper resistant.

Figure 5:
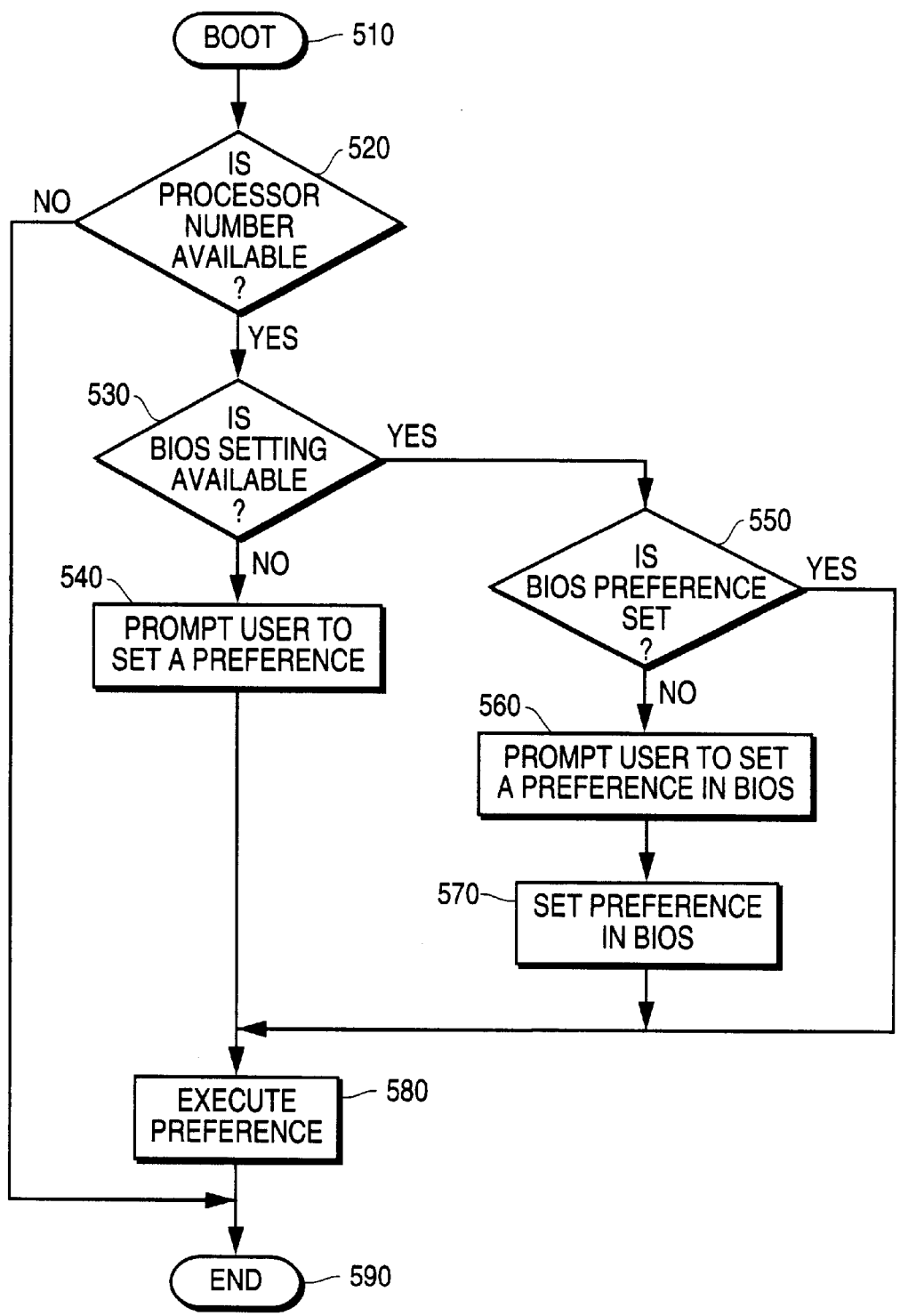
FIG. 5 is a flowchart of setting a preference.

FIG. 5 is a flowchart of setting the sticky bit. The sticky bit may be set manually by the user, or via a BIOS programmed preference. For one embodiment, the sticky bit may only be set by a system manager. For one embodiment, the BIOS programmed preference may not be accessible directly by the user.

At block 510, the booting process is initiated. For one embodiment, this is only a hard reboot of the computer, and a soft boot, i.e. without turning off all power to the processor, does not initiate this process. For one embodiment, this process is only initiated if the user presses a key. Otherwise, a preset preference is entered.

At block 520, the process queries whether the processor number function is available. For one embodiment, the process does this by using the CPUID macro instruction to determine whether the processor supports the processor number function and check the function to see if the processor supports the function. If the processor number function is not available, the process continues directly to block 590, and the process terminates. If the processor number function is available, the process continues to block 530.

At block 530, the process queries whether the BIOS setting is available. For one embodiment, the preference can be set in the BIOS, to automatically be entered upon boot-up. This is advantageous for a user who prefers to keep the same setting over an extended period of time. If BIOS setting is available, the process continues to block 550. Otherwise, the process continues to block 540.

At block 540, the user is prompted to enter a preference. This preference indicates whether the processor number is released to any queries. Alternatively, based upon a number of possible different sticky bits, the user (or network administrator) may be able to set the level of access to the processor number. For one embodiment, the user selects a highest permissible level of access. For another embodiment, the user indicates the access at each level of privilege.

The process then continues to block 580, where the preference is executed. For one embodiment, the preference is executed by setting the sticky bit to the appropriate value. The process then continues to block 590, and ends. The preference is now set. For one embodiment, the preference is maintained until the next time a boot process is encountered. For another embodiment, a user may revoke access privileges via a software application, but may not add additional access privileges outside the boot process. For yet another embodiment, both revocation and addition of privileges may be initiated via a software program, outside of the boot process.

At block 530, if the BIOS setting was found available, the process continued to block 550. At block 550, the process determines whether the BIOS preference has been set. If no BIOS preference has been set, the process continues to block 560. If a BIOS preference has been set, the user need not reenter that preference. Therefore, the process continues directly to block 580. For one embodiment, the user may interrupt this automatic setting by pressing a key or otherwise indicating that he or she wishes to change the preset preferences. In that instance, the process continues to block 560.

At block 560, the user is prompted to enter a preference into BIOS. The user may enter a preference which will be referenced upon subsequent boot-ups.

At block 570, the preference is set in BIOS. For one embodiment, this is set such that one may not access this preferred setting, except during the boot-up process. The process then continues to block 580.

Figure 6:
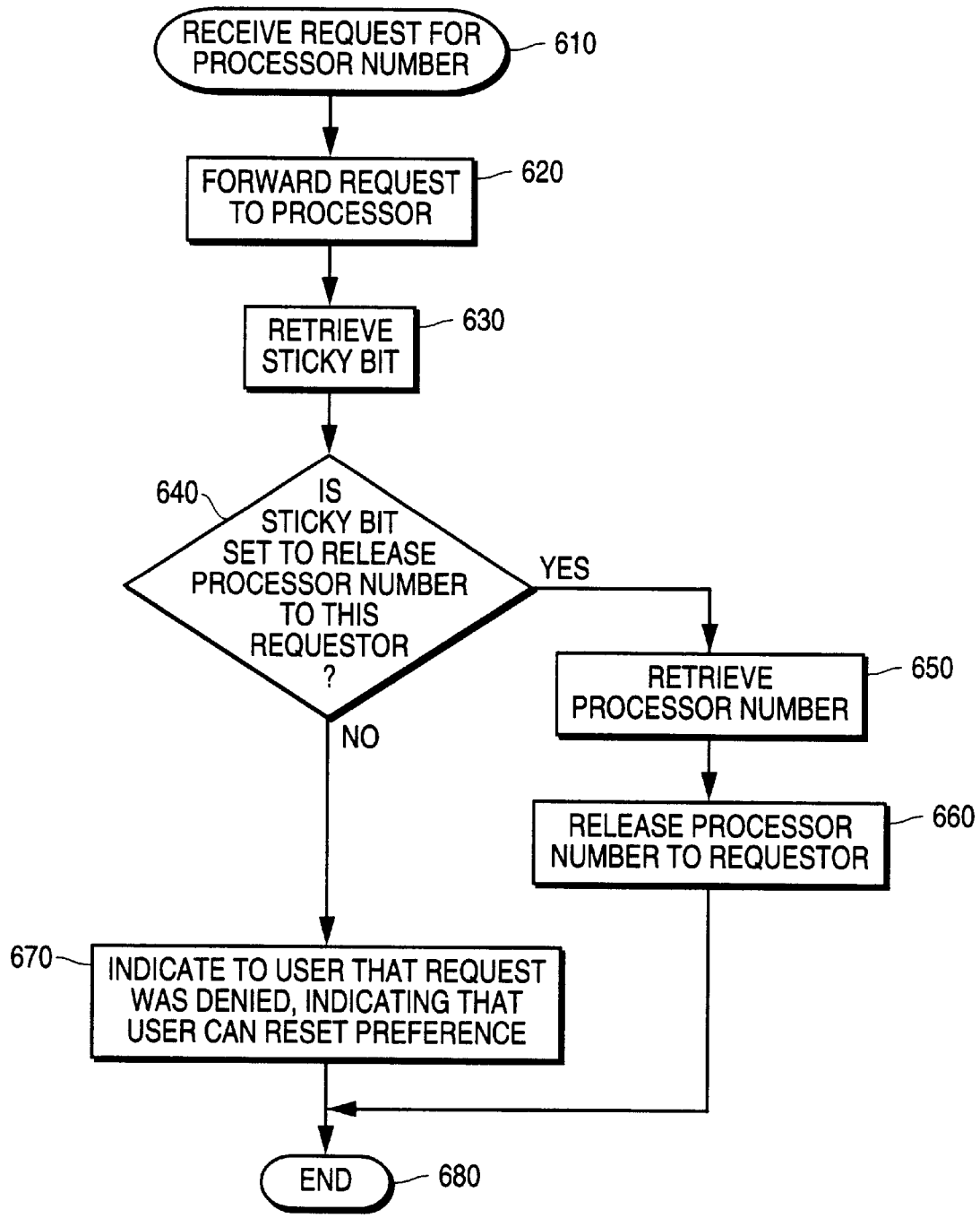
FIG. 6 is a flowchart of requesting the processor number.

FIG. 6 is a flowchart of using the system when the sticky bit is set. A request is received for the processor number. For one embodiment, such a request may be from a software program within the computer, a peripheral device coupled to the computer, others servers on the network, or from the Internet. For one embodiment, the request may be a Java applet.

At block 620, the request is forwarded to the processor.

At block 630, the sticky bit is retrieved. As discussed above, the sticky bit is securely stored, such that it is not accessible to be changed.

At block 640, the process determines whether the sticky bit is set to release the processor number to the specific requester. The sticky bit may be set to release the processor number in response to a query from a requester, or to refuse to release the processor number. If the preference is set to release the processor number, the process continues to block 650. Otherwise, the processor continues to block 670.

At block 650, the processor number is retrieved. For one embodiment, this is done by executing the CPUID instruction with the value of the eax register set to 3. For another embodiment, another method of retrieving the processor number may be used. For one embodiment, the number retrieved is not the processor number, and some processing takes place at this step.

At block 660, the processor number is released to the requester. At block 690, the process ends.

If, at block 640, the sticky bit was set not to release the processor number, the process continued to block 670. At block 670, the user may be notified that a request to release the processor number was refused, and indicating that this preference may be reset by the user. For one embodiment, no such notification may be provided. For one embodiment, however, a tracking mechanism may track the requests that are refused. For one embodiment, a notification may notify the requester that the request was not fulfilled. For another embodiment, there may be no response sent to the query, if the sticky bit is set not to release the processor number.

At block 690, the process ends. This process is invoked every time there is a request for the processor number.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A software method of selectively releasing a processor number encoded in a processor, the method comprising:

determining if the processor number is available to a first type of query; and displaying the processor number in response to the query if a display decision controllable by a user is set to display the processor number;

wherein the user is provided control over whether or not to release the processor number.

2. The method of claim 1, wherein the display decision is sticky, such that the display decision is only changed by an active intervention by the user.

3. The method of claim 2, further comprising:

permitting the user to alter the display decision at boot-up only.

4. The method of claim 1, wherein displaying comprises making the processor number available to software applications.

5. The method of claim 1, wherein the display decision may be dependent upon an identity of a requester.

6. The method of claim 5, wherein the display decision comprises a plurality of levels of access based on a location of the requester.

7. A method comprising:

receiving a request for a processor number;

querying a preference set in the processor to reveal or not reveal the processor number, the preference set by the a user; and transmitting the processor number if the preference states that the processor number may be revealed.

8. A software method of setting a state in a processor regarding whether a processor number encoded in the processor will be available for reading, the method comprising:

permitting the user to enter an indication whether the processor number should be available for reading by a program; and setting a state to inhibit the processor number from being read by a program if the indication indicates that the processor number should not be available for reading by the program.

9. The method of claim 8, wherein the software that prompts the user is part of the boot-up software of the processor.

10. The method of claim 8, wherein the software that prompts the user is an application that runs on top of an operating system that runs on the processor.

11. The method of claim 8, wherein the software that permits the user to change the state is available only upon booting of the processor.

12. The method of claim 8, wherein the state setting the preference of the user is sticky, such that the state is only changed by an active intervention by the user.

13. The method of claim 8, wherein the availability of the processor number is dependent upon an identity of a requester.

14. The method of claim 13, wherein the state indicates a plurality of levels of access based on a location of the requester.

15. The method of claim 8, wherein displaying comprises making the processor number available to software applications.

16. A machine readable medium having stored thereon data representing sequences of instructions, which when executed by a computer system, cause said computer system to perform the steps of:

permitting the user to enter an indication whether the processor number should be available for reading by a program; and setting a state to inhibit the processor number from being read by a program if the indication indicates that the processor number should not be available for reading by the program.

17. The machine readable medium of claim 16, wherein the state setting the preference of the user is sticky, such that the state is only changed by an active intervention by the user.

18. The machine readable medium of claim 16, wherein the software that permits the user to change the state is available only upon booting of the processor.

19. The machine readable medium of claim 16, wherein the display decision may be dependent upon an identity of a requester.

20. The machine readable medium of claim 19, wherein the state indicates a plurality of levels of access based on a location of the requester.

* * * * *